July 3, 1923.
F. L. MILLER
ADJUSTABLE WING FOR WINDSHIELDS
Filed May 18, 1921
1,460,861
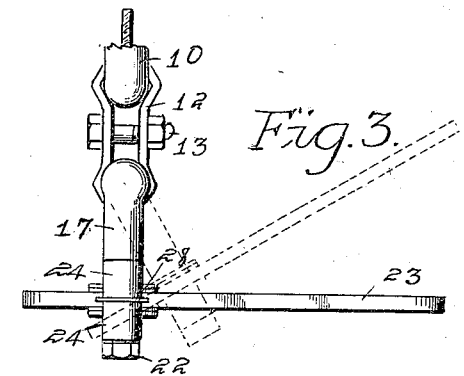
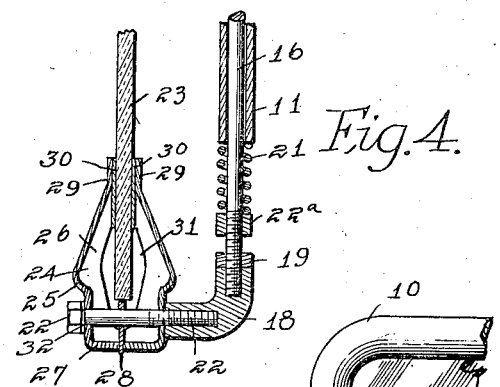
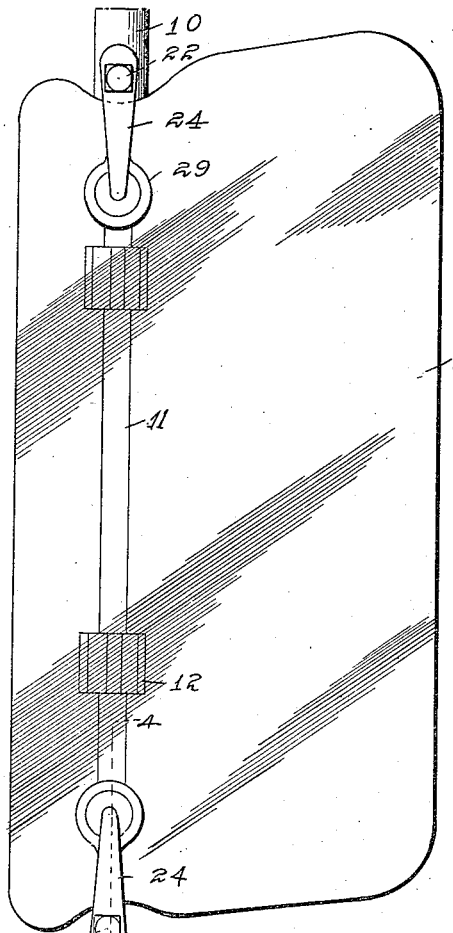
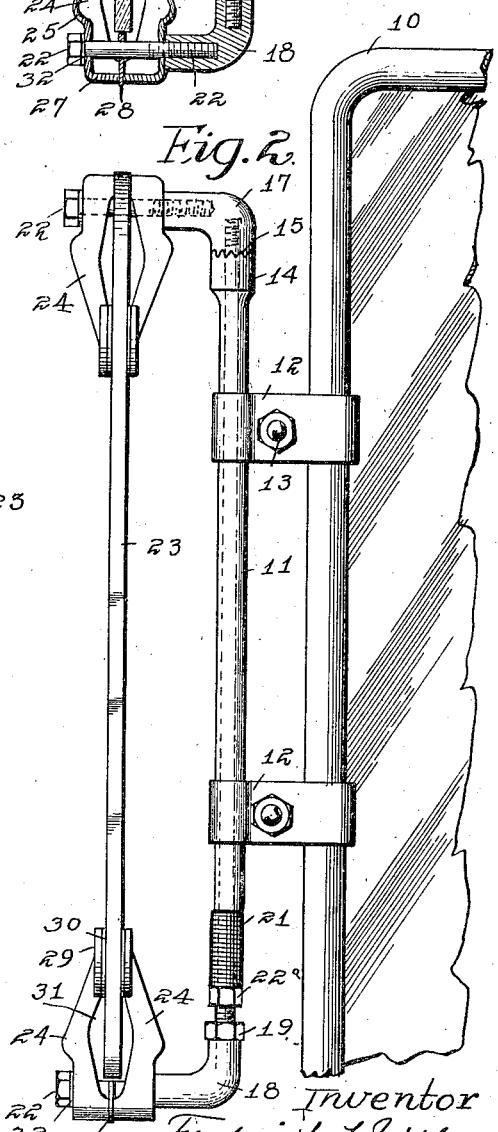
Inventor
Frederick L. Miller
By Orwig & Hague
Attys Patented July 3, 1923.

1,460,861

UNITED STATES PATENT OFFICE.

FREDERICK L. MILLER, OF DES MOINES, IOWA.

ADJUSTABLE WING FOR WINDSHIELDS.

Application filed May 18, 1921. Serial No. 470,662.

*To all whom it may concern:*

Be it known that I, FREDERICK L. MILLER, a citizen of the United States, and resident of Des Moines, in the county of Polk and State of Iowa, have invented a certain new and useful Adjustable Wing for Windshields, of which the following is a specification.

The object of my invention is to provide a detachable and adjustable transparent wind wing to be applied to each end of the ordinary wind shield for automobiles.

A further object is to provide a detachable and adjustable mechanism for wind shields which may be employed to carry and support a transparent wing member in such a manner that the said member may be easily and quickly replaced in case it should become broken.

A further object is to provide in a detachable and adjustable mechanism supporting a transparent wind wing, improved means for mounting the wings without drilling holes through the transparent members.

A still further object is to provide in an adjustable wind wing for a wind shield, improved means for adjusting the wing relative to the said shield.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved wind wing.

Figure 2 is an end elevation of the same showing the manner in which it is mounted on a wind shield.

Figure 3 is a top view of Figure 2 showing the manner in which it is clamped to the wind shield, and also the adjustable wing moved to one of its positions of movement in dotted lines.

Figure 4 is a sectional view taken on the line 4—4 of Figure 1.

The numeral 10 indicates a portion of the frame of a wind shield of the ordinary construction. Mounted parallel with the upright portion of the member 10, I have provided a tube 11 which is adjustably secured in position by means of clamp devices 12. These clamps are mounted in position by means of bolts 13, said clamps 12 being similar to those used in mounting similar devices and form no part of my present invention.

The upright end of the tube 11 is formed with an enlarged cylindrical portion 14 having its upper edge serrated at 15. Rotatively and slidably mounted within the tube 11, I have provided a shaft 16, the upper end of which is screw threaded and mounted in an elbow member 17, the lower edge of said member 17 is provided with a series of serrations designed to coact with the serrated portion 15. The lower end of the shaft 16 is screw threaded and extends considerably below the lower end of the tube 11, the lower end of said shaft being provided with an elbow member 18 similar to the member 17, both of said elbows having horizontally projecting portions. A lock nut 19 is provided for securing the elbow member 18 rigidly in position on said rod.

I have also provided a coil spring 21 on the rod 11, one end of said spring being designed to rest against the lower end of the tube 11, and the other end designed to rest against a nut 22ª which is also mounted on the shaft 11.

By this arrangement, it will be seen that I have provided means for yieldingly holding the serrated portion of the member 17 in engagement with the serrated portion of the member 14. Each of the horizontal portions of the members 17 and 18 are provided with a screw threaded opening in their ends, each of which is designed to receive a screw threaded bolt 22. These bolts are for securing the wing member 23 in a parallel position relative to the tube 11 and between the said bolts. This wing member 23 is preferably made of transparent material such as glass.

Glass wings have heretofore been secured in position by drilling holes through the glass and then placing bolts through the holes. This involves considerable expense in drilling the holes and also weakens the wing member to such an extent that they are easily broken. To overcome this difficulty, I have provided clamp members 24 which are mounted on the said bolts 22 in such a manner as to frictionally engage the wing member, each of the members 24 is preferably constructed from a single piece of blank sheet metal formed into shape by the stamping method, and comprising a back member 25 having side members 26 arranged laterally at each edge, and an end member 27. Each of the back members 25 is provided with an opening a slight distance above the end member 27, as shown in Figure 4, through which the bolts 22 are mounted.

A washer 28 is mounted on the bolt 22 and rests between the adjacent ends of the members 27. This washer is for the purpose of providing means for the comparatively thin edges of the members 27 to rest against so there is no danger of one edge slipping past the other.

The free ends of the members 25 are provided with circular plates 29, each of which is designed to carry a rubber washer 30 on its inner face. These washers are designed to rest against the wing member 23. The inner edges of the members 26 are formed curved at 31 for the purpose of giving clearance between them and the glass 23.

By this construction it will be seen that as the bolt 22 is tightened, the plates 29 will be forced toward each other and thereby rigidly secured in position. A rubber washer 32 is provided for the head of the bolt 22 so that a slight movement of the members 25 may be permitted without working the bolts 22 loose.

The plate 23 may be of any desired length or shape, but I have mounted the members 29 near one edge of the said plate 23 which is preferably constructed substantially rectangular, one side of the rectangle being mounted vertically. The edge closest to the members 29 is usually carried forward.

By the construction just described it will be seen that by grasping the rear edges of the plates 23 with the hand, the wing may be swung about a vertical axis and thereby the angle of the plate relative to the wind shield may be adjusted. When pressure is applied to the rear edge of the plate in a lateral manner, a twisting movement will be imparted to the vertical portion of the member 17 which will cause the serrated portion of said member to be moved relative to the serrated portion of the member 14, the upward movement of said member 17 being permitted by the spring 21 yielding. When the serrated portions of said members coact with each other, the spring 21 serves to hold the wing member against a swinging or rotary movement.

Thus it will be seen that I have provided a device for mounting breakable wind wings of simple and neat design so arranged that the wing member may be easily and quickly replaced if necessary, and also so arranged that the angle of the same may be easily and quickly adjusted without the use of tools, and the whole mechanism being so arranged that it may be quickly applied to or detached from the wind shield members. It is to be understood, of course, that the brackets 12 may be applied to any other suitable supporting means other than a wind shield frame.

I claim as my invention:

1. In a device of the class described, a tube having one end serrated, a shaft slidably and rotatively mounted within said tube having its ends projecting beyond the ends of said tube, an elbow member on each end of said shaft, one end of one of said elbows being serrated to coact with the serrated end of said tube, a spring on the opposite end of said shaft between the corresponding ends of said tube and said elbow, a nut for adjusting said spring, a wing member and means for securing said wing member to said elbows, and means for clamping said tube to a support.

2. In a device of the class described, a tube having one end serrated, a shaft slidably and rotatively mounted within said tube, the lower end of said shaft extending below the lower end of said tube, an elbow member on the upper end of said shaft having its lower edge provided with serrations designed to coact with the serrations on the upper end of said tube, a spring on the lower end of said shaft adjacent to the lower end of said tube, a nut in the lower end of said shaft to be designed to engage the lower end of said spring, an elbow on the lower end of said shaft, a bolt in each of said elbows, oppositely arranged clamp devices on each of said bolts, a wing member mounted between said oppositely arranged clamp devices and yielding means between said clamps and said wing member, said clamps being so arranged that as the bolts are tightened the yielding member may be forced into engagement with said wing member.

Des Moines, Iowa, April 25, 1921.

FREDERICK L. MILLER.